UNITED STATES PATENT OFFICE.

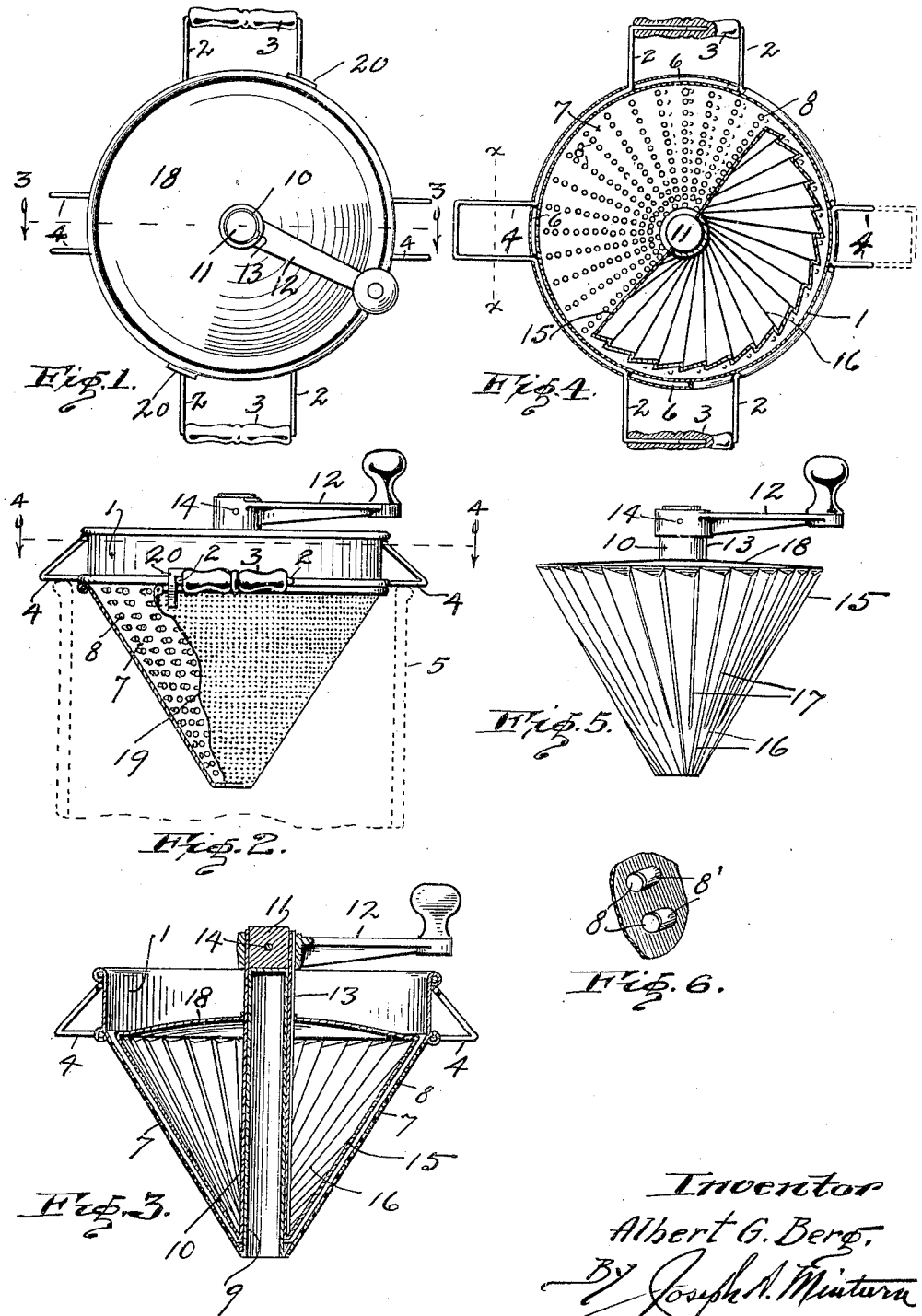

ALBERT G. BERG, OF INDIANAPOLIS, INDIANA.

COLANDER.

1,375,812.  Specification of Letters Patent.  Patented Apr. 26, 1921.

Application filed February 16, 1921. Serial No. 445,495.

*To all whom it may concern:*

Be it known that I, ALBERT G. BERG, a citizen of the United States, residing at Indianapolis, in the county of Marion and State of Indiana, have invented new and useful Improvements in Colanders, of which the following is a specification.

This invention relates to improvements in colanders for separating the food portions of meats, fruits and vegetables from the bones, skins, stems, seeds, cores and such like undesirable parts, and the object of the invention is to provide a durable and practical device for the rapid and economical production of jams, jellies, catsups, soups, etc., from raw or cooked materials; for rendering lard, making cracker-meal, and for general and varied use in the kitchen for disintegrating and separating food products in the preparation of food for the table.

The specific objects in the mechanical construction will hereinafter appear and the novel features thereof will be set forth in the claims.

In the accompanying drawing forming a part hereof and in which like characters of reference indicate like parts, Figure 1 is a top plan view of the colander. Fig. 2 is a side elevation of same with the filtering cone attachment applied and broken away in part. Fig. 3 is a vertical section on the line 3—3 of Fig. 1. Fig. 4 is a section on the line 4—4 of Fig. 2. Fig. 5 is a side elevation of the rotatable cone removed from the rest of the apparatus, and Fig. 6 is a fragment of the wall of the casing showing the details of the openings and indented cutting edges.

The outside casing comprises a cylindrical rim 1 finished with a top wired edge of usual construction and a bottom wired edge of special construction in that the wire on two diametrically opposite sides is bent out in square-cornered loops 2, 2, to form the supports for handles 3, 3, and at two other diametrically opposite places to form the supports 4, 4, which with the loops of the handles, sustain the colander while in use by resting upon the rim of a jar or other vessel shown in dotted lines 5 in Fig. 2. For greater strength I prefer to bend the parallel wires of the loops on the line *x—x* of Fig. 4 and turn the ends of the loops back into contact with the cylindrical rim 1 under its top bead which provides an effectual brace. In practice it is easier to make this wire in two pieces with the joints in the handles 3, 3, and the spaces between the stems of the several loops are filled in with separate wires 6.

The casing 1 is continued in an inverted depending truncated cone 7 provided with a large number of holes 8 at one side of which the sheet metal of which the cone is made is inwardly indented as shown at 8' in Fig. 6, to form cutting edges. Soldered or otherwise fixed to the truncated end of the cone 7, and extending upwardly within the outer casing to about the level of the top of the rim 1, is a cylindrical column 9, preferably capped at its upper end.

A hollow column 10 makes a close running fit around the column 9. Its upper end is closed by a metal block 11 which has its bearing upon the top of the column 9. A crank-arm 12 is mounted on the upper end of the column 10. The bore of its hub receiving said column has a spline-way, and the column is made out of sheet metal seamed at 13, on the outside of the column. This seam takes in the spline-way of the handle helping to make their union a rigid one, and the parts may be further united by a pin 14. Rigidly secured to the column 10 is an inverted truncated cone 15, the wall of which has corrugations 16 in spiral form, extending from top to bottom, and similar corrugations 17 terminating suitably above the bottom so as not to unduly reduce the definition of corrugations 16 by making too many at the small end of 15. A closure 18 between the upper end of 15 and the column 10 is preferably arched upwardly as shown in Fig. 3, to drain liquid overflow to the perforated casing.

What I designate as a filtering cone comprises the finely perforated sheet metal jacket 19 which is applied as an attachment and is removably secured outside of the member 7 by hooks 20, 20, which slip over wires 2, 2, or 4, 4, depending upon which happen to be most convenient. By the use of this attachment the slow process of filtering through cloth bags is eliminated to produce clear jellies, bouillon, etc.

In the use of my invention the material to be operated on is deposited in the casing 1, 7, the cone 15 having been removed for the purpose; the latter is then replaced and rotated by manually operating the hand crank. The spiral corrugations feed the material against the cutting edges of the member 7 and through the perforations, and also gradually downward due to the spiral inclination of the corrugations. But the choking of the colander by the wedging of the tapering member 15 into the bottom of the member 7 and congestion there of the material under treatment is prevented by the contact of block 11 with the top of column 9. This is an important feature of my invention as it insures the practical discharge through the colander and thereby the saving of everything of food value, without clogging the mechanism of the machine.

Having thus fully described my invention, what I claim as new and wish to secure by Letters Patent of the United States, is:—

1. In a culinary apparatus, an inverted truncated conical perforated member having inwardly projecting cutters and having a central cylindrical column, a truncated conical member having spiral corrugations to force the material downwardly and also against the cutters of the first member and also having a central cylindrical column assembled on the first column and limited in its downward movement by contact with the top of the first column, and upon said contact having a running bearing upon the first column, and means for producing relative rotation between the two truncated conical members.

2. In a culinary apparatus, an inverted truncated conical perforated member having inwardly projecting cutters and having a central cylindrical column, a truncated conical member having spiral corrugations to force the material downwardly and also against the cutters of the first member and also having a central cylindrical column assembled on the first column and limited in its downward movement by contact with the top of the first column, and upon said contact having a running bearing upon the first column, said last column having a portion to make bearing contact with the top of the first column to limit the approach toward each other of the two truncated conical members, and means for producing relative rotation between the two truncated conical members.

3. In a culinary apparatus, a pair of downwardly tapering members one having a plurality of perforations and inwardly projecting cutters and the other rotating within the first and having corrugations to force food material placed between the members through the perforations of the first member, and a third tapering member with smaller perforations removably secured around the first member.

4. In a culinary apparatus of the character specified, an inverted truncated conical member having inwardly projecting cutters and a central column, a movable downwardly tapering member having corrugations, said second member having a central column assembled on the first column, said second member adapted to approach the first member as the work progresses to force out the product, and means at the top of the column of the first member to limit the approach of the two members to avoid clogging after most of the product has passed.

5. In a culinary apparatus of the character specified a revoluble downwardly tapering member having corrugations in its tapering surface some of which extend spirally from top to bottom of said member and others of which are similar but extend only part way to the bottom.

6. In a culinary apparatus comprising a sheet metal body and a wire around which the metal of the body is rolled, said wire being bent out in loops, some of said loops being bent back to form braces.

7. In a culinary apparatus comprising a sheet metal body and a wire around which the metal of the body is rolled, said wire being bent out in loops from which the body is suspended, some of said loops forming bails for handles and other of said loops being bent back against the body to form braces.

8. A support for a colander comprising a sheet metal body having a wired edge and a wire around which the lower metal of the body is rolled, said wire being bent out in loops at diametrically opposite points of the body, some of said loops forming bails for handles and other of said loops being bent back into contact with the body and wired edge to form braces.

Signed at Indianapolis, Indiana, this the 28 day of January, 1921.

ALBERT G. BERG.